Dec. 13, 1966 J. L. WEININGER 3,291,709
DRY METHOD OF FORMING A SILVER CHLORIDE ELECTRODE
HAVING SILVER FILAMENTS FROM SURFACE TO SURFACE
Filed Nov. 13, 1963

Inventor:
Joseph L. Weininger,
by Paul R. Webb, II
His Attorney.

United States Patent Office 3,291,709
Patented Dec. 13, 1966

3,291,709
DRY METHOD OF FORMING A SILVER CHLORIDE
ELECTRODE HAVING S I L V E R FILAMENTS
FROM SURFACE TO SURFACE
Joseph L. Weininger, Schenectady, N.Y., assignor to
General Electric Company, a corporation of New York
Filed Nov. 13, 1963, Ser. No. 323,496
4 Claims. (Cl. 204—130)

This invention relates to electrodes and to methods of forming electrodes for electric cells and more particularly to silver chloride electrodes and to methods of forming silver chloride electrodes.

Silver chloride electrodes are useful as cathodes in electric cells using various electrolytes and anodic materials. For example, silver chloride electrodes and cells containing them are described in U.S. Letters Patent 3,007,993, issued November 7, 1961. The method of producing the silver chloride electrodes set forth in the above patent are described in U.S. Letters Patent 3,006,821, issued October 31, 1961.

In the above U.S. Letters Patent 3,007,993, there is disclosed an electrode for an electric cell which has a silver base, a layer of silver chloride on the surface of the base, and a plurality of filamentary bridges of reduced metallic silver extending from the silver base to the outer surface of the silver chloride. Secondly, there is described an electrode for an electric cell having a silver base, a layer of silver chloride on the surface of the base, a thin layer of porous reduced metallic silver on the outer surface of the silver chloride layer, and a plurality of filamentary bridges of reduced metallic silver extending between and electrically connected to the metal base and the outer layer of metallic silver.

The manufacture of the above electrodes is described in U.S. Letters Patent 3,006,821, wherein a metallic silver base in the form of a silver screen is anodized in an aqueous electrolyte containing chloride ions such as sodium chloride or hydrochloric acid. The silver base, with a layer of silver chloride thereon, is then made the cathode in a suitable electrolyte, for example, by reversing the polarity of the electrodes in the apparatus. During the cathodizing operation, filamentary bridges of porous metallic silver are formed within the silver chloride layer between the surface of the silver base and the outer surface of the silver chloride layer. A layer of silver is formed on the silver chloride layer by immersing the coated base in a suitable reducing agent adapted to reduce chemically the entire outer surface of the silver chloride to a conductive layer of porous silver.

The present invention is directed to an improved silver chloride electrode and to improved methods of forming such electrodes for electric cells.

It is an object of my invention to provide a silver chloride electrode.

It is another object of my invention to provide a method of forming a silver chloride electrode for an electric cell.

It is a further object of my invention to provide a method of forming an electrode having a metallic base with a silver layer thereon, a layer of silver chloride on the silver layer, and a plurality of conductive filamentary bridges of metallic silver extending from one surface of the silver chloride layer to the other surface of the silver chloride layer.

It is a still further object of my invention to provide a method of forming an electrode in an air or reducing atmosphere.

In carrying out my invention in one form, a method of forming an electrode comprises providing a silver chloride body, and passing a D.C. electric current through the body thereby forming a plurality of conductive filamentary bridges of metallic silver extending from one surface to the other surface of the body.

These and various other objects, features and advantages of the invention will be better understood from the following description taken in connection with the accompanying drawing in which.

Figure 1:
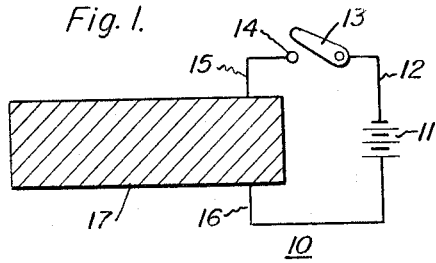
FIGURE 1 is a schematic view of apparatus for producing a silver chloride electrode.

In FIGURE 1 of the drawing, there is shown a schematic view of apparatus 10 to form a silver chloride electrode in accordance with my invention. A D.C. power source 11 in the form of a battery has a lead 12 connected to a switch 13. A terminal 14 has a lead 15 connected thereto. A lead 16 is connected to the opposite terminal of battery 11. Leads 15 and 16 contact on opposite surfaces a silver chloride body in the form of a sheet of the material 17. This sheet of silver chloride is formed, for example, by pressing silver chloride powder into sheet form.

Power source 11 is activated by closing switch 13 against terminal 14 whereby current flows through leads 12, 15, body 17 and lead 16. In this manner, a plurality of conductive filamentary bridges of metallic silver are formed which extend from one surface of body 17 to the other surface of body 17. While the anode electrode is shown contacting the upper surface of body 17, the leads can be reversed. The voltage which is impressed across body 17, can vary widely. The period of time required to form the filamentary bridges of metallic silver in body 17 depends on the structure of the silver chloride whereby a time period from less than a second to several minutes is satisfactory.

In accordance with the basic principles of electricity it is readily recognized that electrons are supplied to the body through one attached lead and are taken from the body through the remaining attached lead. Thus, a D.C. electrical current is passed through body 17 by providing for the electronic conduction of electricity to and from the body as contrasted to the ionic conduction of electricity required by electrolytic processes.

Figure 2:
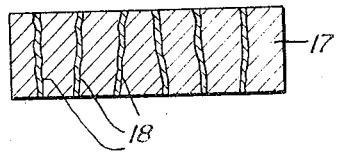
FIGURE 2 is a sectional view of a silver chloride electrode embodying my invention.

In FIGURE 2 of the drawing, there is shown a sectional view of silver chloride body 17 with a plurality of filamentary bridges of metallic silver 18 extending from one surface to the other surface of body 17. These bridges of metallic silver 18 are produced in the apparatus shown in FIGURE 1.

Figure 3:
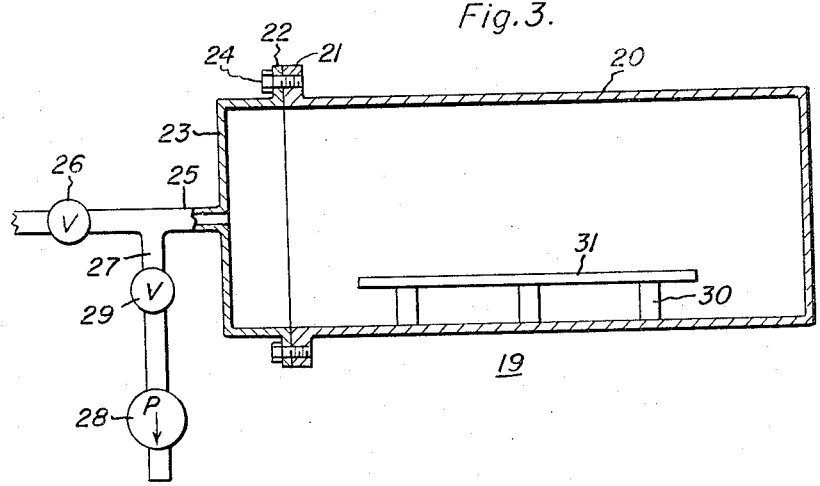
FIGURE 3 is a sectional view of apparatus for forming a silver chloride layer on a metallic base such as a silver base.

In FIGURE 3 of the drawing, there is shown generally at 19, apparatus for producing a silver chloride layer upon a metallic base in the form of a silver sheet. Apparatus 19 comprises a chamber 20 with a flange 21 at one end which abuts against an associated flange 22 of a removable end cover 23. A plurality of bolts 24 affix cover 23 to chamber 20 with bolts 24 being threaded through flanges 23 and 22. An inlet line 25 with a valve 26 communicates with chamber 20 and is connected to a chlorine source (not shown). Valve 26 regulates the flow of chlorine to chamber 20. A second line 27 is connected to inlet line 25 between valve 26 and end cover 23. This line 27 is connected to a vacuum pump 28 and regulated by a valve 29 to exhaust fumes from chamber 20 and to provide for controlling the atmospheric pressure of the chlorine vapor within chamber 20. A furnace (not shown) is provided into which chamber 20 is inserted to heat the chloride gas and form a silver chloride layer on a silver sheet by vapor phase tarnishing of the silver layer. Within chamber 20, there are shown several brackets 30 for supporting a metallic base 31 in the form of a metallic silver sheet thereon. The sheet can also be composed of another metal with a layer of silver thereon.

In the operation of the apparatus shown in FIGURE 3 of the drawing, a sheet 31 of silver or other metal such as a magnesium base with a silver plating thereon, is inserted within chamber 20 and supported on brackets 30 therein. It is preferred to form the silver chloride layer on only one surface of the silver sheet. The other surfaces of the silver sheet are coated with a material such as a chlorinated rubber paint to prevent the silver chloride from forming thereon which material is subsequently removed. The inlet end of chamber 20 is then closed by end cover 23 by threading bolts 24 through flanges 22 and 21. Valve 26 is closed, valve 29 is opened and pump 28 exhausts air from chamber 20 to reduce the chamber atmosphere to the desired pressure level.

Valve 29 is closed and valve 26 is opened to admit chlorine gas into chamber 20. Chamber 20 is positioned in a furnace (not shown) to heat the chlorine gas to the desired temperature to vapor phase tarnish the silver sheet. Since the melting point of silver chloride is 457.5° C., the maximum temperature that can be employed in the process is about 450 °C.

An increased reaction rate, which is accomplished by an increase in pressure or temperature, increases the thickness of the silver chloride layer or provides a particular thickness of silver chloride layer within a reduced time period. For example, a 15 mil thickness of silver chloride can be formed on the silver layer at a temperature of 450° C. at 0.1 atmosphere of pressure in 52.8 hours. At the same temperature, with the pressure increased to 20 atmospheres, the same thickness of silver chloride can be formed on the silver sheet in 3.72 hours. At the above temperature, as the pressure is varied between the above pressures, the time period of layer formation is also changed.

After the desired thickness of a silver chloride layer is formed on silver base 31, the heat is discontinued by removing chamber 20 from the furnace and the chloride gas supply is discontinued to chamber 20 by closing valve 26. Valve 29 is opened to exhaust the affluent stream from the chamber and the chamber is allowed to cool to room temperature. Subsequently, bolts 24 are unthreaded and end cover 23 is removed from chamber 20 so that the silver sheet 31 with a silver chloride layer thereon is removed from apparatus 19.

Figure 4:
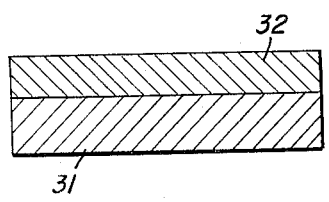
FIGURE 4 is a partial sectional view of a silver base with a layer of silver chloride thereon produced in the apparatus of FIGURE 1.

In FIGURE 4 of the drawing, there is shown a sectional view of silver sheet 31 with a silver chloride layer 32 thereon. For example, this layer 32 can be 15 mils thick. Silver layer 31 with silver chloride layer 32 thereon shown in FIGURE 4, is made in the apparatus shown in FIGURE 3 of the drawing. In addition to the apparatus shown in FIGURE 3 for providing the silver chloride layer by vapor phase tarnishing, it is also possible to provide such a layer on the silver sheet by other suitable methods. For example, silver sheet 31 can be anodized in a suitable electrolyte such as sodium chloride to provide the silver chloride layer 32 thereon. However, in the employment of the apparatus in FIGURE 3, there is provided a layer of silver chloride on a silver sheet which is removed from the apparatus of FIGURE 3 and is in dry state and ready to have subsequent operations performed thereon to produce a silver chloride electrode.

Figure 5:
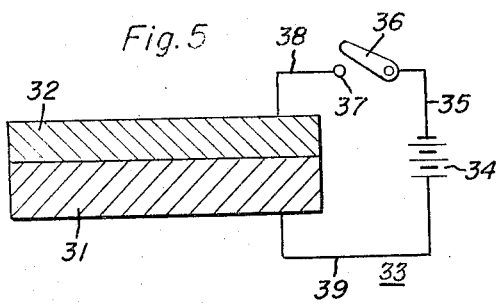
FIGURE 5 is a schematic view of apparatus for producing a silver chloride electrode.

In FIGURE 5 of the drawing, there is shown a schematic view of apparatus 33 to produce a silver chloride electrode in accordance with my invention. A D.C. power source 34 in the form of a battery has a lead 35 connected to a switch 36. A terminal 37 has a lead 38 connected thereto. A lead 39 is connected to the opposite terminal of battery 34. Lead 38 contacts the external surface of silver chloride layer 32 while lead 39 contacts the external surface of silver base or layer 31.

Power source 34 is activated by closing switch 36 against terminal 37 whereby current flows through leads 35 and 38, silver chloride layer 32, silver layer 31 and lead 39. The silver chloride layer acts as a solid electrolyte during this process step. In this manner, a plurality of conductive filamentary bridges of metallic silver are formed which extend from one surface of silver chloride layer 32 to the other surface of silver chloride layer 32. While the anode electrode is shown contacting the surface of layer 32, the leads can be reversed. The voltage which is impressed across silver chloride layer 32 and silver base 31 can vary widely. The period of time required to form the filamentary bridges of metallic silver from the one surface of silver chloride layer 32 to the other surface of silver chloride layer 32 depends on the structure of the silver chloride whereby a time period from less than a second to several minutes is satisfactory.

It is noted that the arrangements shown in FIGURES 1 and 5 differ only by the support of the silver chloride on a silver substrate in the latter instance. Electrically the arrangements are substantially identical, since the silver base 31 functions electrically merely as an electronically conductive extension of lead 39.

Figure 6:
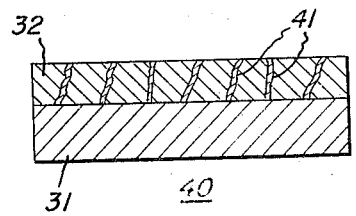
FIGURE 6 is a sectional view of a silver chloride electrode embodying my invention.

In FIGURE 6 of the drawing, there is shown a sectional view of a silver chloride electrode which is employed subsequently as a cathode in a battery or cell employing a magnesium anode and an electrolyte. This electrode, which is designated 40, has a silver base 31 with a layer of silver chloride 32 thereon which was produced in the apparatus of FIGURE 3. A plurality of conductive filamentary bridges of metallic silver 41 are shown which extend from one surface of silver chloride layer 32 to the other surface of silver chloride layer 32.

Several examples of electrodes which were made in accordance with the methods of the present invention are as follows:

*Example I*

A 15 mil thick silver chloride body in the form of a sheet had a direct current potential of 47.2 volts supplied thereto for 2.5 minutes in accordance with the method step described above for FIGURE 1 of the drawing. A plurality of conductive filamentary bridges of metallic silver were formed extending from one surface of the body to the other surface of the body forming an electrode. The resistivity of the silver chloride body was determined before the application of the above voltage and subsequent thereto. The resistivity changed from an initial $2.5 \times 10^{+7}$ ohm-centimeter to 6.8 ohm-centimeter.

*Example II*

A 15 mil thick silver chloride body in the form of a sheet had a direct current potential of 39 volts supplied thereto for 2.5 minutes in accordance with the method step described above for FIGURE 1 of the drawing. A plurality of conductive filamentary bridges of metallic silver were formed extending from one surface of the body to the other surface of the body forming an electrode. The resistivity of the silver chloride body was determined before the application of the above voltage and subsequent thereto. The resistivity changed from an initial $2.5 \times 10^{+7}$ ohm-centimeter to 11.2 ohm-centimeter.

*Example III*

A 20 mil thick silver sheet was vapor phase tarnished in the apparatus of FIGURE 1 at a temperature of 400° C. at a chlorine pressure of 1.0 atmosphere for a period of 53.2 hours to produce a 15 mil layer of silver chloride on each surface thereof. The electrode structure had a direct current potential of 44.5 volts supplied thereto for 24 seconds by leads contacting the respective silver chloride layers. A plurality of conductive filamentary bridges of metallic silver were formed extending from one surface of one silver chloride layer to the other surface of the same silver chloride layer, which had been contacted by the anode lead, forming an electrode. The other silver chloride layer was not affected. The resistance of the electrode comprising the silver sheet and the silver chloride layer with the filamentary bridges of metallic silver was measured before the application of the above voltage and subsequent thereto. The resistance changed from an initial $0.77 \times 10^6$ ohms to less than 1 ohm.

While other modifications of this invention and variations of the method which may be employed within the scope of the invention have not been described, the invention is intended to include such that may be embraced within the following claims.

What I claim as new and desire to secure by Letters Patent of the United States is:

1. A method of forming an electrode which comprises providing a silver chloride body, and electronically conducting to and from said body a D.C. electric current said current being electronically applied to said body while said body is maintained in a dry state thereby forming a plurality of conductive filamentary bridges of metallic silver extending from one surface of said body to the other surface of said body.

2. A method of forming an electrode which comprises providing a metallic body having a silver layer thereon, forming a layer of silver chloride on at least one surface of the silver layer of said body, and electronically conducting to and from said layered body a D.C. electric current said current being electronically applied to said body while said body is maintained in a dry state thereby forming a plurality of conductive filamentary bridges of metallic silver extending from one surface of said silver chloride layer to the other surface of said silver chloride layer.

3. A method of forming an electrode which comprises providing a silver body, forming a layer of silver chloride on at least one surface of said body, and electronically conducting to and from said layered body a D.C. electric current said current being electronically applied to said body while said body is maintained in a dry state thereby forming a plurality of conductive filamentary bridges of metallic silver extending from the surface of said silver chloride layer to the other surface of said silver chloride layer.

4. A method of forming an electrode which comprises providing a silver body, vapor phase tarnishing said silver body in an atmosphere comprised of chlorine thereby forming a layer of silver chloride on at least one surface of said body, and electronically conducting to and from said layered body a D.C. electric current said current being electronically applied to said body while said body is maintained in a dry state thereby forming a plurality of conductive filamentary bridges of metallic silver extending from one surface of said silver chloride layer to the other surface of said silver chloride layer.

References Cited by the Examiner

UNITED STATES PATENTS 3,006,821   10/1961   Haring _____ 204—38

OTHER REFERENCES

Mellor: Comprehensive Treatise on Inorganic and Theoretical Chemistry, Supplement II, Part I, 1956, page 387.

ALLEN B. CURTIS, *Primary Examiner.*

WINSTON A. DOUGLAS, *Examiner.*

B. J. OHLENDORF, *Assistant Examiner.*